Patented Mar. 12, 1946

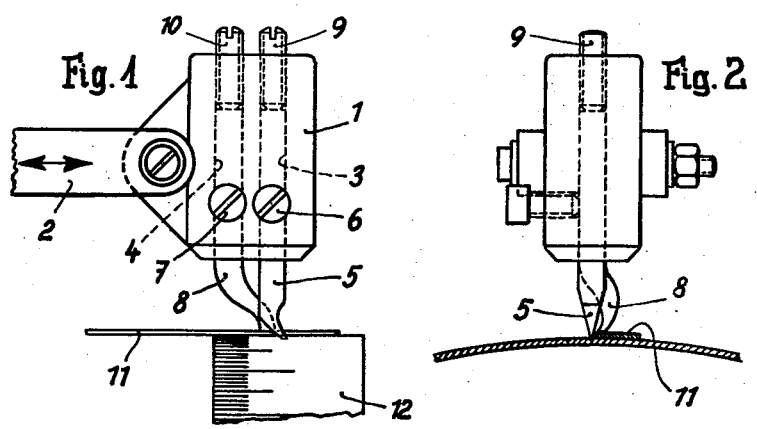
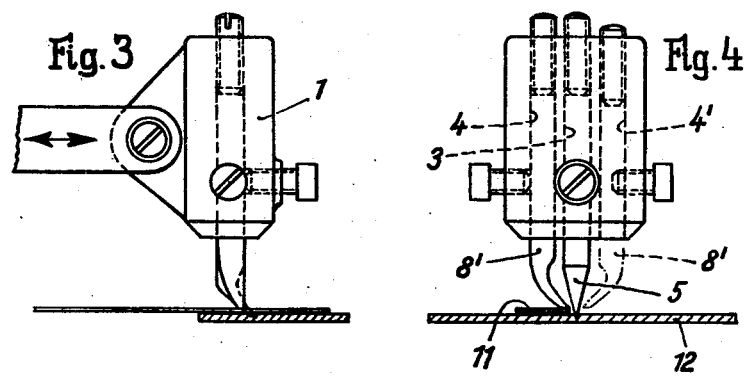
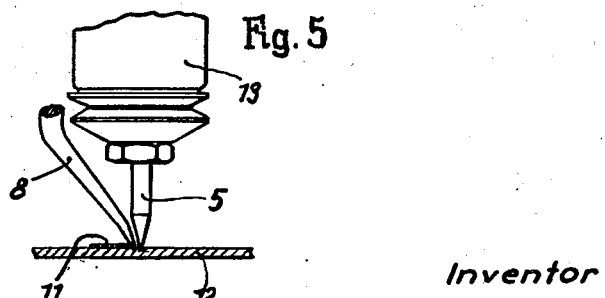

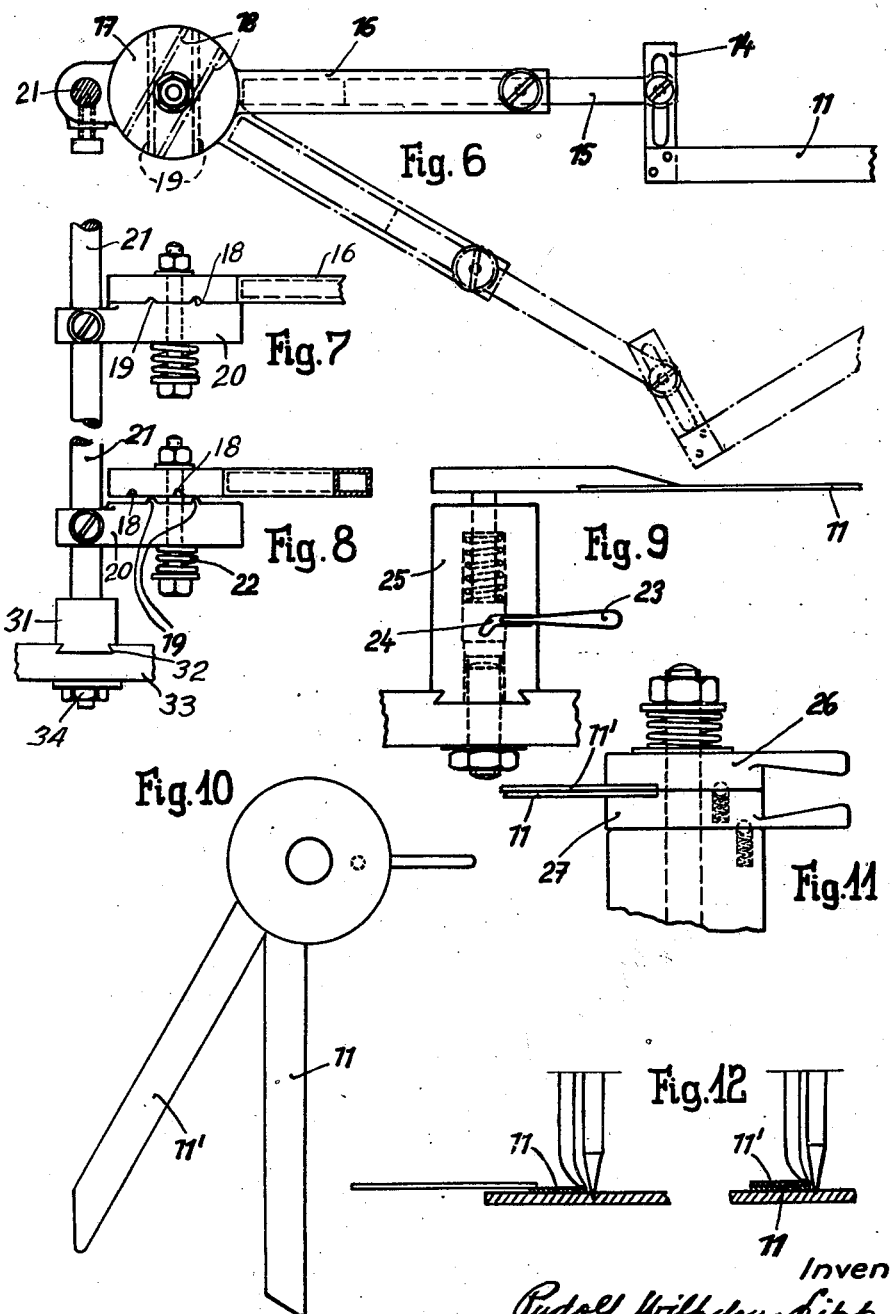

2,396,584

UNITED STATES PATENT OFFICE 2,396,584

CUTTING FRAME FOR DIVIDING APPARATUS

Rudolf Wilhelm Lipp, Berlin-Pankow, Germany; vested in the Alien Property Custodian Application November 4, 1941, Serial No. 417,826
In Germany August 22, 1940

9 Claims. (Cl. 90—62)

This invention relates to a cutting frame for dividing apparatus, more particularly, for scale dividing machines.

In the operation of dividing machines, and more particularly scale dividing machines, it is difficult to maintain a constant cutting depth when making the scale lines.

Primarily this difficulty is encountered with very thin material such as it is frequently used for scale discs. Even with the most up to date machines absolutely true running of the thin material cannot be ensured. Therefore, the scale lines on such thin scale material oftentimes turn out unsatisfactory as to uniformity of depth.

It is the object of the present invention to avoid this difficulty. With this object in view, the cutting frame according to the present invention comprises an additional depth-defining device in the form of a contact member which is arranged beside the cutting tool and moved jointly therewithin the cutting operation, thereby limiting the depth of cutting. By this device the depth of penetration into the workpiece of the cutting tool is fixed one and for all. Even in case of workpieces showing a considerable lack of true running the depth of cutting will be maintained constant, since the depth-limiting tool automatically follows any unevenness of the workpiece.

According to a further feature of the invention the depth limiting device during the cutting operation slides on a protective plate or sheet which rests on the workpiece and is stationary with respect to the same. By the insertion of this protective plate the surfaces of the workpieces which oftentimes are highly sensitive and highly polished, are protected from injury. The depth-limiting device thus is enabled to fulfill its important task of maintaining the cutting depth constant without directly engaging the surface of the workpiece. The protective plate which remains stationary during the cutting operation cannot cause any injury to the surface of the workpiece, since it is not moved with respect to this surface during the cutting operation.

Advantageously the depth-limiting device and the cutting tool are arranged on a common cutting head which is spring-acted towards the workpiece. This arrangement permits an absolutely automatic working of the depth-limiting device. Once the depth-limiting device has been adjusted for the desired depth of cutting, no further adjustments need be made.

According to a further important feature of the invention the protective plate is made to lie resiliently against the workpiece and to be automatically lifted off from the same as to the cutting head is lifted off. In this manner the protective plate is prevented from sliding on the surface of the workpiece before and after the cutting operation.

In some instances, it may be desirable to produce cuttings of different depth in one workpiece. To render this possible, the thickness of the protective plates may be made to vary in the region intended for cooperation with the depth-limiting device. It is also contemplated that the protective plate may be stepped for cutting several scale lines in succession.

Scale discs in many instances are to be provided with shallow scale lines alternating with lines of greater depth. Hitherto, in order to accomplish this, the cutting head after having finished the scale lines of one depth had to be readjusted for cutting the second type of lines. According to the present invention such readjustment is rendered unnecessary by the provision on the swingable arm for the protective plate of additional protective plates that can be swung over the first plate. In this manner the cutting depth can be varied by superposing several protective plates without readjusting the cutting head.

The invention will be better understood by reference to the following detailed description in connection with the accompanying drawings showing by way of example and purely schematically some embodiments of the invention and in which:

Fig. 1 is a side elevation of a cutting head having the invention applied thereto.

Fig. 2 is a front elevation of the same cutting head.

Fig. 3 is a side elevation of a second type of cutting head according to the invention.

Fig. 4 is a front elevation of the cutting head of Fig. 3.

Fig. 5 is a front elevation of a third embodiment.

Fig. 6 is a plan view of a holder for the protective plate.

Fig. 7 is a fragmentary side elevation of the holder of Fig. 6, in one working position.

Fig. 8 shows the same holder in another working position.

Fig. 9 is a side view of a modified holder for the protective plate.

Fig. 10 is a plan view of a holder arranged for two protective plates.

Fig. 11 is a side view of the holder of Fig. 10.

Fig. 12 is a front view showing two different working positions of the protective plates of Fig. 10.

Similar characters of reference denote similar parts in the different views.

Referring now to the drawings in greater detail, and first to Figs. 1 and 2, it will be seen that a cutting head 1 is jointed to a longitudinally movable driving arm 2, and provided with two bores 3 and 4, arranged one behind the other. Secured in bore 3 by means of a set screw 6 is a cutting stylus or point 5, while a depth-limiting device in the form of a contact member 8 is secured in bore 4, with the aid of a screw 7, the screws 6 and 7 serving for a coarse adjustment of point 5 or contact member 8, resp. Further screws 9 and 10 permit a fine adjustment of point 5 or member 8, resp. The contact member 8 lies on a protective plate 11, which in turn rests on the workpiece 12.

In the embodiment of Figs. 3 and 4 the bores for the cutting point and for the depth-limiting member are arranged side by side. In this case two bores 4, 4', are provided for the depth-limiting member, i. e, on both sides of the bore 3 for the cutting point. The depth-limiting member 8' in this case is so constructed that it can be arranged either to the right or to the left of the cutting point 5. The workpiece 12' in this case is a round disc as distinct from the drum or barrel shape workpiece of Figs. 1 and 2.

The embodiment of Fig. 5 corresponds to that of Fig. 1 as regards the arrangement of the depth-limiting member 8 and the cutting member 5, the latter, however, in this case being constructed as a milling cutter secured to the cutter head 13.

The protective plate 11 is provided on an arm 14 which is adjustable longitudinally on a further arm 15, the latter in turn being secured to a holder 16 for longitudinal adjustment. With the aid of these two adjustments the protective plate 11 may be brought into any desired position, such as that indicated in Fig. 6 in dot and dash lines. The holder 16 is mounted on a swivelling head 17 which is provided with two parallel longitudinal grooves 18, corresponding as to their position and shape to the ribs 19 on a support 20 which is vertically adjustable on a rod 21 suitably mounted adjacent the cutter-head. As illustrated in Fig. 8, the vertical rod 21 may be carried by an adjustable support 31 having a dovetail lower portion slidable in groove 32 in the bed-plate 33, and held in adjusted positions by lock nut 34. The swivelling head 17 and the support 20 are pressed together by means of a spring 22.

In the full-line position of Fig. 6 the ribs 19 are engaged with the grooves 18, as shown in Fig. 7. When swinging holder 16 and protective plate 11 the ribs 19 must at first be disengaged from gooves 18, thereby lifting the holder 16 and its protective plate 11. Only now the swinging may take place. Again, moving back the protective plate from its swung-out position, it must at first be swung back into its position for use, in lifted condition. Only after having reached this position for use the lowering of swivelling head 17 and protective plate 11 can take place.

In the embodiment of Fig. 9 the protective plate 11 is swung with the aid of an arm 23 which is mounted for sliding in a groove 24 of a support 25. Groove 24 has a step which causes the lifting of protective plate 11 as soon as it is to be swung out of its operative position.

In the embodiment of Figs. 10 to 12 there are provided two swivelling heads 26 and 27 mounted for sliding on each other, a protective plate 11, 11' being mounted on each swivelling head. These protective plates can be swung into their operative positions singly or jointly, i. e., one being placed above the other. In Fig. 12, left, only one protective plate 11 is in its operative position, while on the right both protective plates 11 and 11' are superposed in their operative positions.

In order to use the cutting head according to the invention, protective plate 11 which is resilient is swung to its operative position, being at first positioned slightly above the workpiece 12, with a small clearance. Only after having reached its working position it is lowered automatically, softly engaging the workpiece 12 without being moved laterally with respect to it. Now, the cutting head is applied after the cutting depth previously has been accurately adjusted, it engages plate 11, thereby invariably determining the cutting depth of all scale lines made in this operation, independently of the surface conditions of workpiece 12.

After each cutting operation the plate 11 springs back slightly, being pressed onto the workpiece 12 for the next cutting operation by the contact member 8.

Where it is intended to make cuttings of different depth, several protective plates are used, as shown in Figs. 10 to 12. At first the scale lines of uniform depth are cut, using one protective plate only. Having finished these scale lines a second protective plate is placed over the first, whereby the cutting point 5 is lifted by the thickness of the second protective plate now engaged by the contact member, and the cutting depth of the cutting point is reduced accordingly. Now the scale lines of smaller depth can be cut.

By using protective plates of suitable dimensions, for instance, in this manner that the thickness of the plates in the reach of the contact member increases or decreases gradually, scale lines of increasing and decreasing depth can be made. Also, different scale lines shortly succeeding each other can be produced by using protective plates having steps of different thickness.

The method and apparatus of the present invention have been described in detail with reference to specific embodiments. It is to be understood, however, that the invention is not limited by such specific reference but is broader in scope and capable of other embodiments than those specifically described and illustrated in the drawings.

I claim:

1. A cutting frame for dividing machines, comprising a cutting tool, a contact member mounted to be movable jointly with said cutting tool, a protective plate independent of the contact member, and means for interposing said protective plate between said contact member and the surface of the workpiece, said contact member being adapted to press said protective plate against said surface, for defining the depth of cutting.

2. A cutting frame for scale dividing machines, comprising a cutting head normally urged toward the workpiece, a cutting tool and a contact member, both mounted in the cutting head, and means for effecting coarse and fine vertical adjustments of said cutting tool and said contact member on said cutting head, and a guide for the contact member provided in the cutting head on both sides of the cutting tool.

3. A cutting frame for dividing machines, comprising a cutting tool, a contact member mounted to be movable jointly with said cutting tool, a protective plate, a stationary holder on which said protective plate is swingably mounted, and means for interposing said protective plate between said contact member and the surface of the workpiece, said contact member being adapted to press said protective plate against said surface, for defining the depth of cutting.

4. A cutting frame as claimed in claim 3, in which the holder is adapted to be lifted automatically as it is being swung from its operative position to its rest position, and to hold said protective plate for longitudinal and transverse adjustment.

5. A cutting frame for dividing machines, comprising a cutting tool, a contact member mounted to be movable jointly with said cutting tool, a resilient protective plate, means for holding said protective plate over the surface of the workpiece, with a slight clearance, said contact member being adapted to press said protective plate against said surface, for defining the depth of cutting.

6. A cutting frame as recited in claim 3, a second protective plate swingably mounted on said holder, and means for interposing the second protective plate between the first-mentioned protective plate and said contact member for collectively defining the depth of cutting.

7. A cutting frame as recited in claim 3, said holder including a horizontal support provided with a plurality of spaced ribs, said protective plate mounting including a swivel head swingable over said support, a plurality of grooves in said head spaced and shaped to receive said ribs of the support when aligned therewith, and spring means to press said swivel head and said support toward each other.

8. In a cutting frame for dividing machines, in combination, a cutting tool, a contact member mounted to be movable jointly with the cutting tool over a workpiece, a resilient protective plate adapted to be inserted between said contact member and said workpiece, and means for holding said protective plate comprising a horizontal support member and a bracket arm including a swivel head member pivoted on said horizontal support, spring means for pressing the swivel head member into contact with the horizontal support member, one of said members being provided with spaced parallel grooves and the other with spaced parallel ribs adapted to fit into said grooves when said members are aligned.

9. In a cutting frame for dividing machines, in combination, a cutting tool, a contact member mounted to be movable jointly with the cutting tool over a workpiece, a resilient protective plate adapted to be inserted between said contact member and said workpiece, and means for holding said protective plate comprising a horizontal support member and a bracket arm including a swivel head member pivoted on said horizontal support, spring means for pressing the swivel head member into contact with the horizontal support member, one of said members being provided with spaced parallel grooves and the other with spaced parallel ribs adapted to fit into said grooves when said members are aligned, and means interposed between said bracket arm and said protective plate for adjusting the position of the protective plate longitudinally and laterally of said bracket arm.

RUDOLF WILHELM LIPP.